(12) United States Patent
Kato

(10) Patent No.: US 10,462,448 B2
(45) Date of Patent: Oct. 29, 2019

(54) IMAGE GENERATION SYSTEM AND IMAGE GENERATION METHOD

(71) Applicant: MITSUBISHI ELECTRIC CORPORATION, Tokyo (JP)

(72) Inventor: Yoshiyuki Kato, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 78 days.

(21) Appl. No.: 15/760,186

(22) PCT Filed: Nov. 9, 2015

(86) PCT No.: PCT/JP2015/081432
§ 371 (c)(1),
(2) Date: Mar. 14, 2018

(87) PCT Pub. No.: WO2017/081717
PCT Pub. Date: May 18, 2017

(65) Prior Publication Data
US 2018/0278914 A1 Sep. 27, 2018

(51) Int. Cl.
*H04N 13/156* (2018.01)
*H04N 7/18* (2006.01)
(Continued)

(52) U.S. Cl.
CPC ....... *H04N 13/156* (2018.05); *G06K 9/00771* (2013.01); *H04N 7/18* (2013.01); *H04N 7/183* (2013.01); *H04N 13/117* (2018.05)

(58) Field of Classification Search
CPC ........ H04N 7/183; H04N 13/117; H04N 7/18; H04N 13/156; G06K 9/00771
See application file for complete search history.

(56) References Cited

U.S. PATENT DOCUMENTS

| 2009/0324110 A1* | 12/2009 | Fujinuki | H04N 19/30 |
| | | | 382/232 |
| 2016/0162139 A1* | 6/2016 | Yoshizawa | G06F 3/0488 |
| | | | 715/776 |
| 2017/0148178 A1* | 5/2017 | Oami | G06T 7/292 |

FOREIGN PATENT DOCUMENTS

| EP | 2 397 386 A1 | 12/2011 |
| JP | 8-256315 A | 10/1996 |
| | (Continued) | |

OTHER PUBLICATIONS

International Search Report for PCT/JP2015/081432 (PCT/ISA/210) dated Feb. 9, 2016.
(Continued)

*Primary Examiner* — Neil R Mikeska
(74) *Attorney, Agent, or Firm* — Birch, Stewart, Kolasch & Birch, LLP

(57) ABSTRACT

Image generation apparatuses (10) are provided so as to correspond to areas (62), respectively, into which a target area (60) is divided, and each image generation apparatus (10) has a plurality of imaging apparatuses (50) connected thereto that each capture a corresponding area which is an area (62) corresponding to the image generation apparatus (10). Each image generation apparatus (10) generates, as partial image data (72), downward view image data for its corresponding area from imaging data (71) captured by the plurality of imaging apparatuses (50). An image integration apparatus (20) allows each of image generation apparatuses (10) provided so as to correspond to areas (62), respectively, that are included in a display area (61), to generate as partial image data (72) for its corresponding area, and combines the partial image data (72) to generate integrated image data (73) which is downward view image data for the display area (61).

3 Claims, 19 Drawing Sheets

(51) Int. Cl.
*H04N 13/117* (2018.01)
*G06K 9/00* (2006.01)

(56) References Cited

FOREIGN PATENT DOCUMENTS

| | | |
|---|---|---|
| JP | 2001-306151 A | 11/2001 |
| JP | 2002-222488 A | 8/2002 |
| JP | 2006-332754 A | 12/2006 |
| JP | 2012-1191 A | 1/2012 |
| JP | 2012-11989 A | 1/2012 |
| JP | 5006187 B2 | 8/2012 |
| JP | 5520142 B2 | 6/2014 |
| WO | WO 2005/094466 A2 | 10/2005 |

OTHER PUBLICATIONS

Japanese Office Action issued in Patent Application No. 2016-523341 dated Jun. 7, 2016.

* cited by examiner

| MONITORING TERMINAL 40 | DISPLAY AREA 61 | INTEGRATED IMAGE DATA 73 | TIME |
|---|---|---|---|
| A | AREA GHKL | *** | yyyy/mm/dd xx:xx:xx |
| D | AREA ABEF | *** | yyyy/mm/dd xx:xx:xx |
| ⋮ | ⋮ | ⋮ | ⋮ |

| MONITORING TERMINAL 40 | TIME T | TIME T-1 | TIME T-2 | ... |
|---|---|---|---|---|
| A | Xm, Ym | Xi, Yi, θi, Li | — | ... |
| B | Xn, Yn | Xa, Ya, θa, La | Xb, Yb, θb, Lb | ... |
| C | Xn, Yn | Xa, Ya, θa, La | Xb, Yb, θb, Lb | ... |
| ... | ... | ... | ... | ... |

IMAGE GENERATION SYSTEM AND IMAGE GENERATION METHOD

TECHNICAL FIELD

The present invention relates to a technique for generating a downward view image for a display area in a target area from imaging data captured by a plurality of imaging apparatuses which are installed in the target area.

BACKGROUND ART

When a congestion state of people is monitored, an overall state can be intuitively determined by checking downward view image data for a wide range which is looked down from immediately above, rather than by checking a state while switching imaging data captured by imaging apparatuses which are installed at various locations.

Patent Literature 1 describes a downward view image data display technique for a train crew member to monitor the states of passengers getting off a train onto a platform and passengers getting on the train from the platform. In Patent Literature 1, imaging data of a plurality of cameras installed on the top of entrance/exit doors of each car are transformed into downward view image data, and the pieces of downward view image data are combined to display panoramic image data for the side of all cars on a monitoring terminal.

CITATION LIST

Patent Literature

Patent Literature 1: JP 2012-001191 A

SUMMARY OF INVENTION

Technical Problem

In Patent Literature 1, panoramic image data for the side of all cars is generated from imaging data, and displayed on a monitoring terminal installed in a crew room. That is, in Patent Literature 1, one piece of panoramic image data whose display area is fixed is generated and displayed on a single monitoring terminal. Hence, Patent Literature 1 does not consider a case in which a display area is specified by each of a plurality of monitoring terminals, and downward view image data for the specified display area is generated and displayed on the corresponding monitoring terminal.

Particularly, Patent Literature 1 does not provide a detailed description about a network between imaging data and an image processing LSI that performs downward view transformation. Hence, when the number of imaging apparatuses reaches several hundred instead of about 10 imaging apparatuses or so that are mounted on a train car, processes therefor are centered on an image processing LSI. As a result, it is difficult to create a downward view image at high speed.

An object of the present invention is to enable to generate downward view image data for a display area at high speed even in a case of specifying a display area by each of a plurality of monitoring terminals and generating downward view image data for the specified display area.

Solution to Problem

An image generation system according to the present invention includes:

image generation apparatuses provided so as to correspond to areas, respectively, into which a target area is divided, the generation apparatuses each being connected to a plurality of imaging apparatuses each capturing a corresponding area being an area that corresponds, and the image generation apparatuses each generating downward view image data for the corresponding area from imaging data captured by the plurality of imaging apparatuses connected; and an image integration apparatus to allow each of image generation apparatuses to generate, as partial image data, downward view image data for a corresponding area of the image generation apparatus, and combine the generated partial image data to generate integrated image data, the image generation apparatuses being provided so as to correspond to areas, respectively, the areas each including at least a part of a display area for which display is requested, the integrated image data being downward view image data for the display area.

Advantageous Effects of Invention

In the present invention, a downward view image data generation process with a large processing load is performed by a plurality of image generation apparatuses in a distributed manner. Hence, even in a case of specifying a display area by each of a plurality of monitoring terminals and generating downward view image data for the specified display area, the downward view image data for the display area can be generated at high speed.

BRIEF DESCRIPTION OF DRAWINGS

FIG. 13 is an illustrative diagram of a cache table 221 according to the second embodiment.

FIG. 14 is an illustrative diagram of a history table 222 according to the second embodiment.

DESCRIPTION OF EMBODIMENTS

First Embodiment
*Description of Summary*

Figure 1:
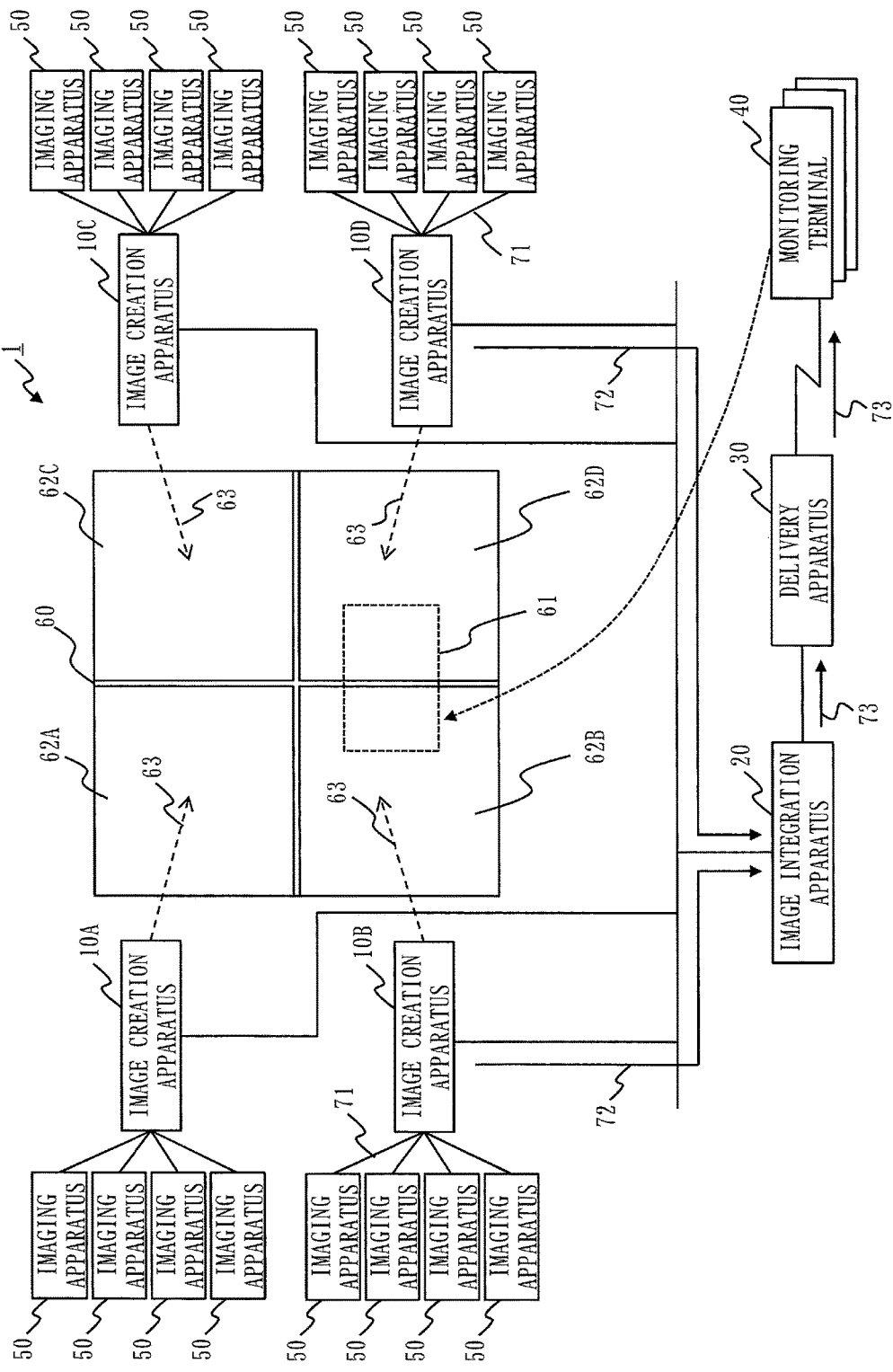
FIG. 1 is a configuration diagram of an image generation system 1 according to a first embodiment.

With reference to FIG. 1, a summary of an image generation system 1 according to a first embodiment will be described.

In the image generation system 1, an area in a target area 60 is specified by a monitoring terminal 40, as a display area 61. By doing so, each of image generation apparatuses 10 corresponding to areas 62, respectively, which are included in the display area 61 generates, as partial image data 72, downward view image data for its corresponding area 62 from imaging data 71 captured by imaging apparatuses 50 connected thereto. Then, an image integration apparatus 20 combines the partial image data 72 and thereby generates integrated image data 73 which is the entire downward view image data for the display area 61, and a delivery apparatus 30 delivers the integrated image data 73 to the monitoring terminal 40.

*Description of Configuration*

With reference to FIG. 1, a configuration of the image generation system 1 according to the first embodiment will be described.

The image generation system 1 includes a plurality of image generation apparatuses 10, the image integration apparatus 20, the delivery apparatus 30, a plurality of monitoring terminals 40, and a plurality of imaging apparatuses 50. In FIG. 1, the image generation system 1 includes four image generation apparatuses 10A to 10D.

The image generation apparatuses 10 are provided so as to correspond to areas 62, respectively, into which the target area 60 is divided. An area 62 corresponding to an image generation apparatus 10 is called a corresponding area 63. In the first embodiment, the image generation apparatus 10A corresponds to an area 62A, the image generation apparatus 10B corresponds to an area 62B, the image generation apparatus 10C corresponds to an area 62C, and the image generation apparatus 10D corresponds to an area 62D. Therefore, in a case of the image generation apparatus 10A, its corresponding area 63 is the area 62A.

A plurality of imaging apparatuses 50 are connected to each image generation apparatus 10 through networks such as wireless local area networks (LANs) or dedicated interfaces. In the first embodiment, four imaging apparatuses 50 are connected to each image generation apparatus 10 through dedicated interfaces. The imaging apparatuses 50 connected to each image generation apparatus 10 have imaging ranges shifted from each other, and are disposed such that a range captured by all connected imaging apparatuses 50 includes a corresponding area 62.

Each image generation apparatus 10 and the image integration apparatus 20 are connected to each other through a network such as a LAN. Likewise, the image integration apparatus 20 and the delivery apparatus 30 are connected to each other through a network such as a LAN. In addition, the delivery apparatus 30 and each monitoring terminal 40 are connected to each other through a network such as a wireless LAN.

The image generation apparatuses 10, the image integration apparatus 20, and the delivery apparatus 30 are computers. The monitoring terminals 40 are computers or portable terminals such as tablet terminals. The imaging apparatuses 50 are cameras.

Note that the delivery apparatus 30 does not necessarily need to be an independent apparatus, and the image integration apparatus 20 may have a function of the delivery apparatus 30.

Figure 2:
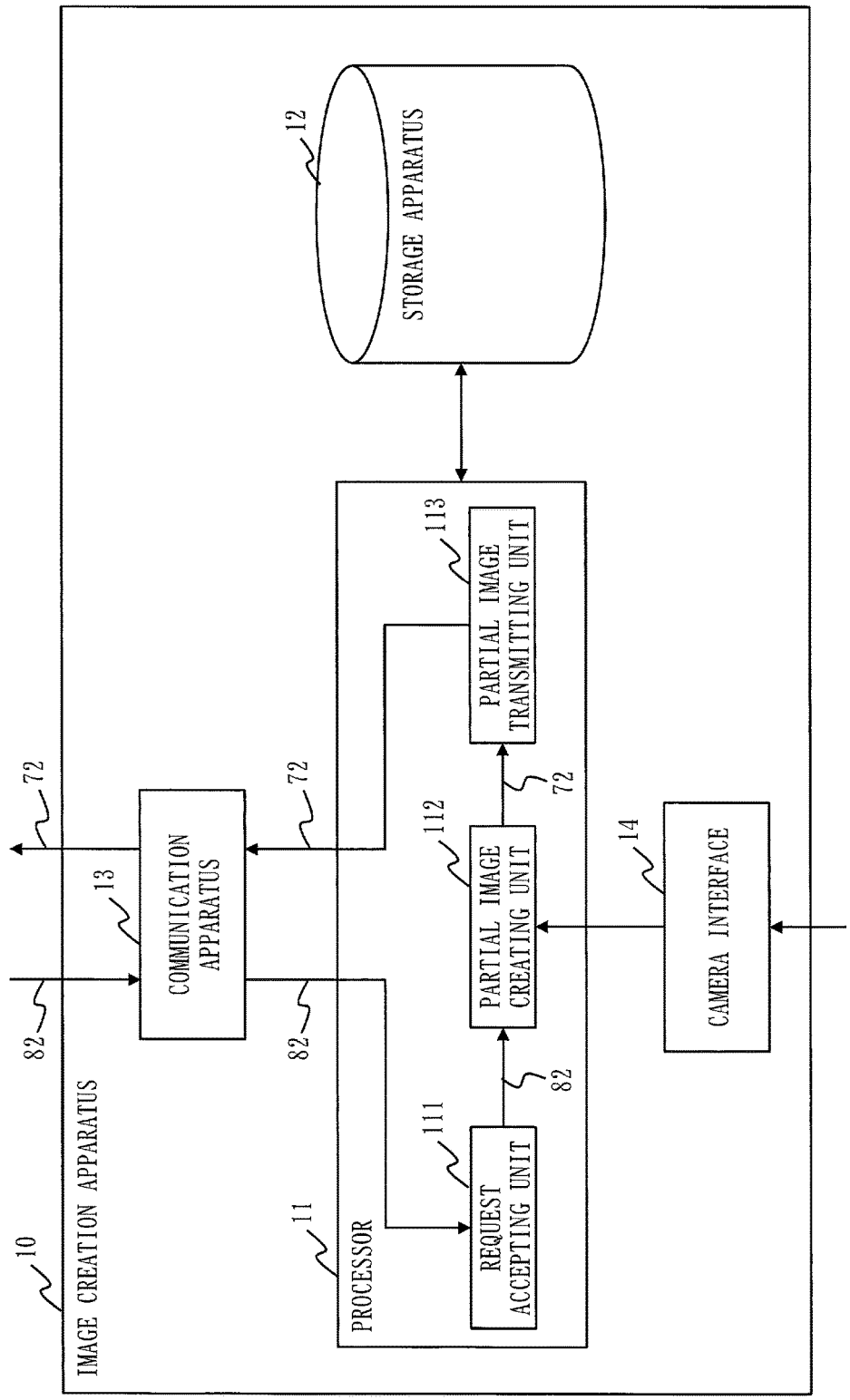
FIG. 2 is a configuration diagram of an image generation apparatus 10 according to the first embodiment.

With reference to FIG. 2, a configuration of the image generation apparatus 10 according to the first embodiment will be described.

The image generation apparatus 10 includes a processor 11, a storage apparatus 12, a communication apparatus 13, and a camera interface 14. The processor 11 is connected to other hardware through signal lines, and controls these other hardware.

The image generation apparatus 10 includes, as a functional configuration, a request accepting unit 111, a partial image generating unit 112, and a partial image transmitting unit 113. A function of each of the request accepting unit 111, the partial image generating unit 112, and the partial image transmitting unit 113 is implemented by software.

The storage apparatus 12 stores therein a program that implements the function of each unit of the image generation apparatus 10. The program is loaded into the processor 11 and executed by the processor 11. By this, the function of each unit of the image generation apparatus 10 is implemented.

Figure 3:
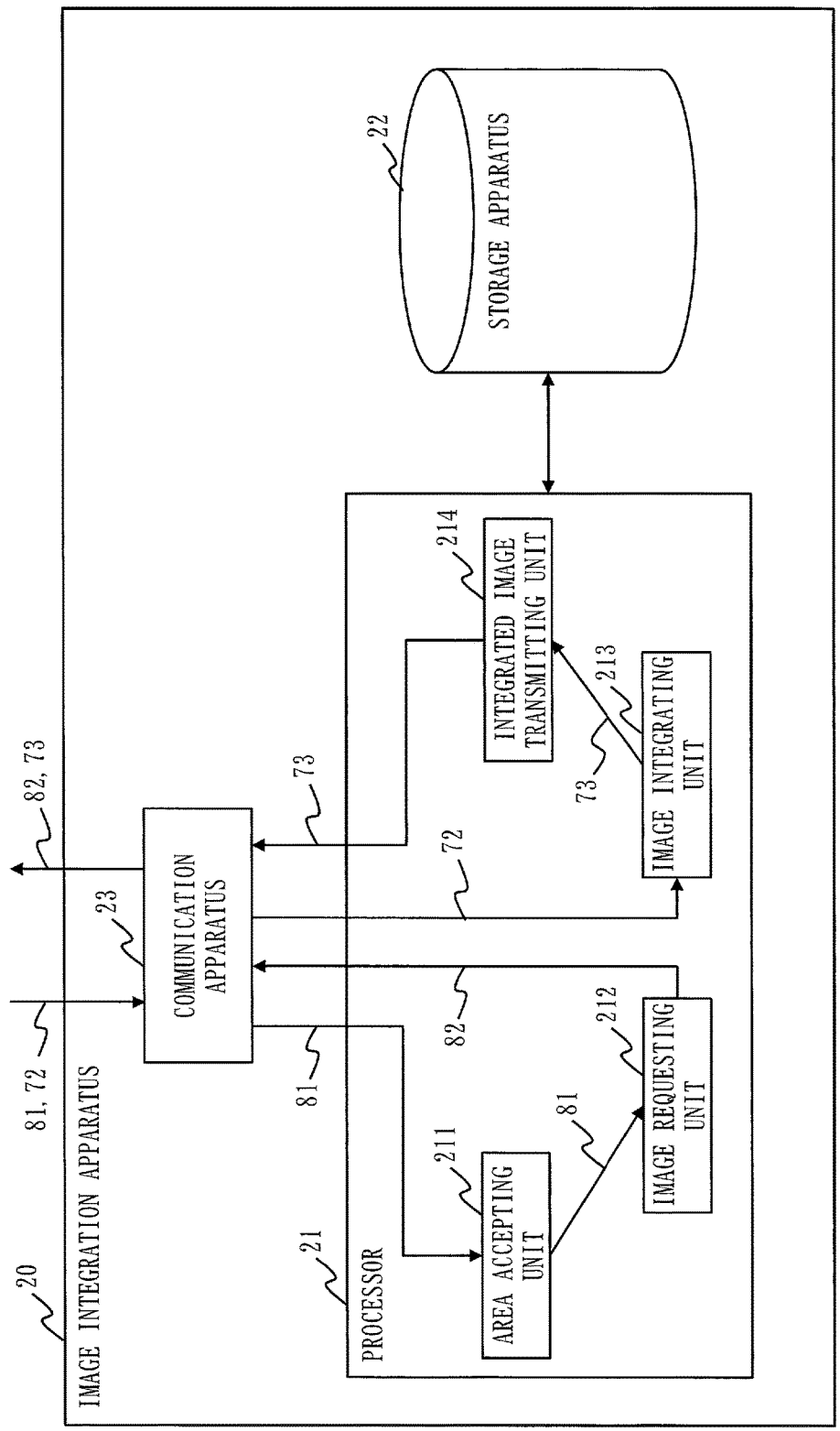
FIG. 3 is a configuration diagram of an image integration apparatus 20 according to the first embodiment.

With reference to FIG. 3, a configuration of the image integration apparatus 20 according to the first embodiment will be described.

The image integration apparatus 20 includes a processor 21, a storage apparatus 22, and a communication apparatus 23. The processor 21 is connected to other hardware through signal lines, and controls these other hardware.

The image integration apparatus 20 includes, as a functional configuration, an area accepting unit 211, an image requesting unit 212, an image integrating unit 213, and an integrated image transmitting unit 214. A function of each of the area accepting unit 211, the image requesting unit 212, the image integrating unit 213, and the integrated image transmitting unit 214 is implemented by software.

The storage apparatus 22 stores therein a program that implements the function of each unit of the image integration apparatus 20. The program is loaded into the processor 21 and executed by the processor 21. By this, the function of each unit of the image integration apparatus 20 is implemented.

Figure 4:
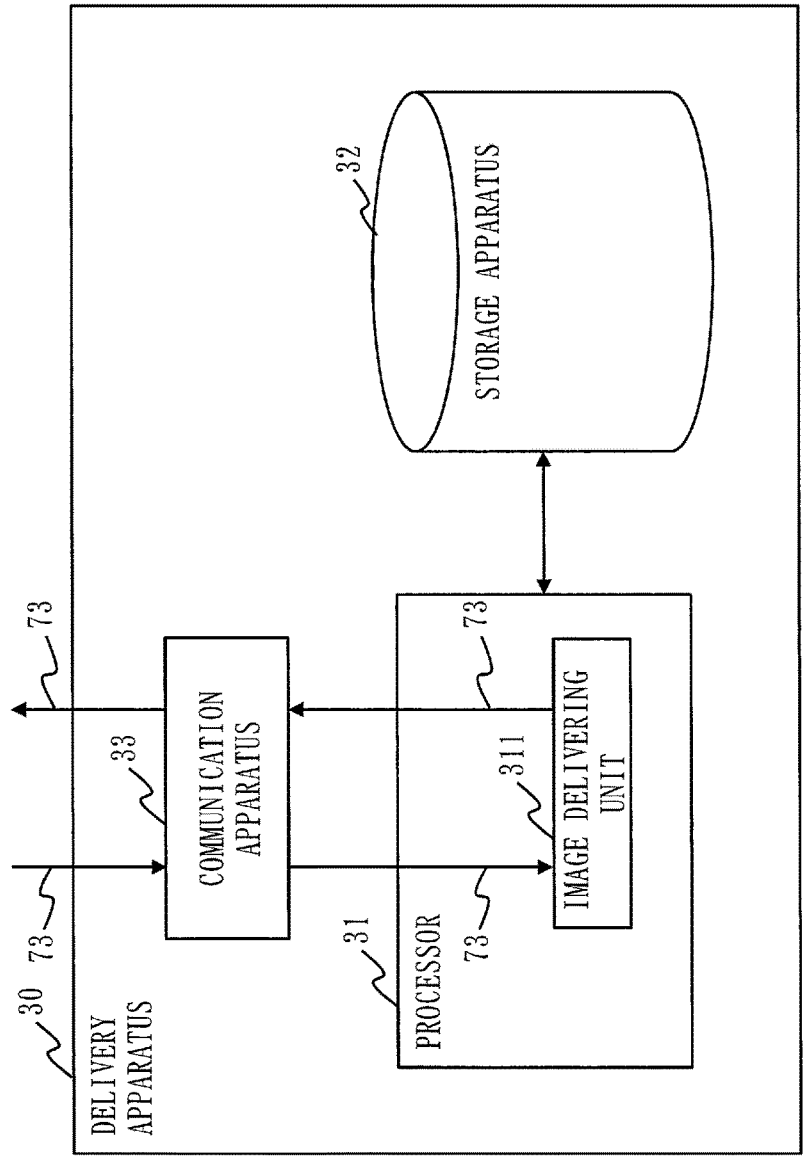
FIG. 4 is a configuration diagram of a delivery apparatus 30 according to the first embodiment.

With reference to FIG. 4, a configuration of the delivery apparatus 30 according to the first embodiment will be described.

The delivery apparatus 30 includes a processor 31, a storage apparatus 32, and a communication apparatus 33. The processor 31 is connected to other hardware through signal lines, and controls these other hardware.

The delivery apparatus 30 includes, as a functional configuration, an image delivering unit 311. A function of the image delivering unit 311 is implemented by software.

The storage apparatus 32 stores therein a program that implements the function of the image delivering unit 311. The program is loaded into the processor 31 and executed by the processor 31. By this, the function of the image delivering unit 311 is implemented.

The processors 11, 21, and 31 each are an IC that performs processing. The IC is an abbreviation for integrated circuit. The processors 11, 21, and 31 each are specifically a CPU, a DSP, and a GPU. The CPU is an abbreviation for central processing unit. The DSP is an abbreviation for digital signal processor. The GPU is an abbreviation for graphics processing unit. The GPU is composed of a circuit such as an SIMD type processor or a dedicated computing processor. The SIMD is an abbreviation for single instruction multiple data.

The storage apparatuses 12, 22, and 32 each are specifically a RAM and an HDD. The RAM is an abbreviation for random access memory. The HDD is an abbreviation for hard disk drive. Each storage apparatus may be composed of other hardware such as a ROM and a flash memory. The ROM is an abbreviation for read only memory.

The communication apparatuses 13, 23, and 33 each are an apparatus including a receiver that receives data and a transmitter that transmits data. The communication apparatuses 13, 23, and 33 each are specifically a communication chip or an NIC. The NIC is an abbreviation for network interface card.

The camera interface 14 is ports to which imaging apparatuses 50 are connected. The camera interface 14 is specifically IEEE 1394 or mini universal serial bus (USB).

Information, data, signal values, and variable values that indicate processing results of each function implemented by the processor 11 are stored in the storage apparatus 12 or a register or a cache memory in the processor 11. The following description is made assuming that information, data, signal values, and variable values that indicate processing results of each function implemented by the processor 11 are stored in the storage apparatus 12.

Likewise, information, data, signal values, and variable values that indicate processing results of each function implemented by the processor 21 are stored in the storage apparatus 22 or a register or a cache memory in the processor 21. The following description is made assuming that information, data, signal values, and variable values that indicate processing results of each function implemented by the processor 21 are stored in the storage apparatus 22.

Likewise, information, data, signal values, and variable values that indicate processing results of each function implemented by the processor 31 are stored in the storage apparatus 32 or a register or a cache memory in the processor 31. The following description is made assuming that information, data, signal values, and variable values that indicate processing results of each function implemented by the processor 31 are stored in the storage apparatus 32.

It is assumed that the programs that implement each function implemented by the processors 11, 21, and 31 are stored in the storage apparatuses 12, 22, and 32. However, the programs may be stored in a portable storage medium such as a magnetic disk, a flexible disk, an optical disc, a compact disc, a Blu-ray (registered trademark) Disc, and a DVD.

FIG. 2 shows only one processor 11. However, there may be a plurality of processors 11, and the plurality of processors 11 may execute the program that implements each function, in cooperation with each other. Likewise, FIGS. 3 and 4 show only one processor 21, 31. However, there may be a plurality of processors 21, 31, and the plurality of processors 21, 31 may execute the program that implements each function, in cooperation with each other.

\*\*\*Description of Operation\*\*\*

Figure 5:
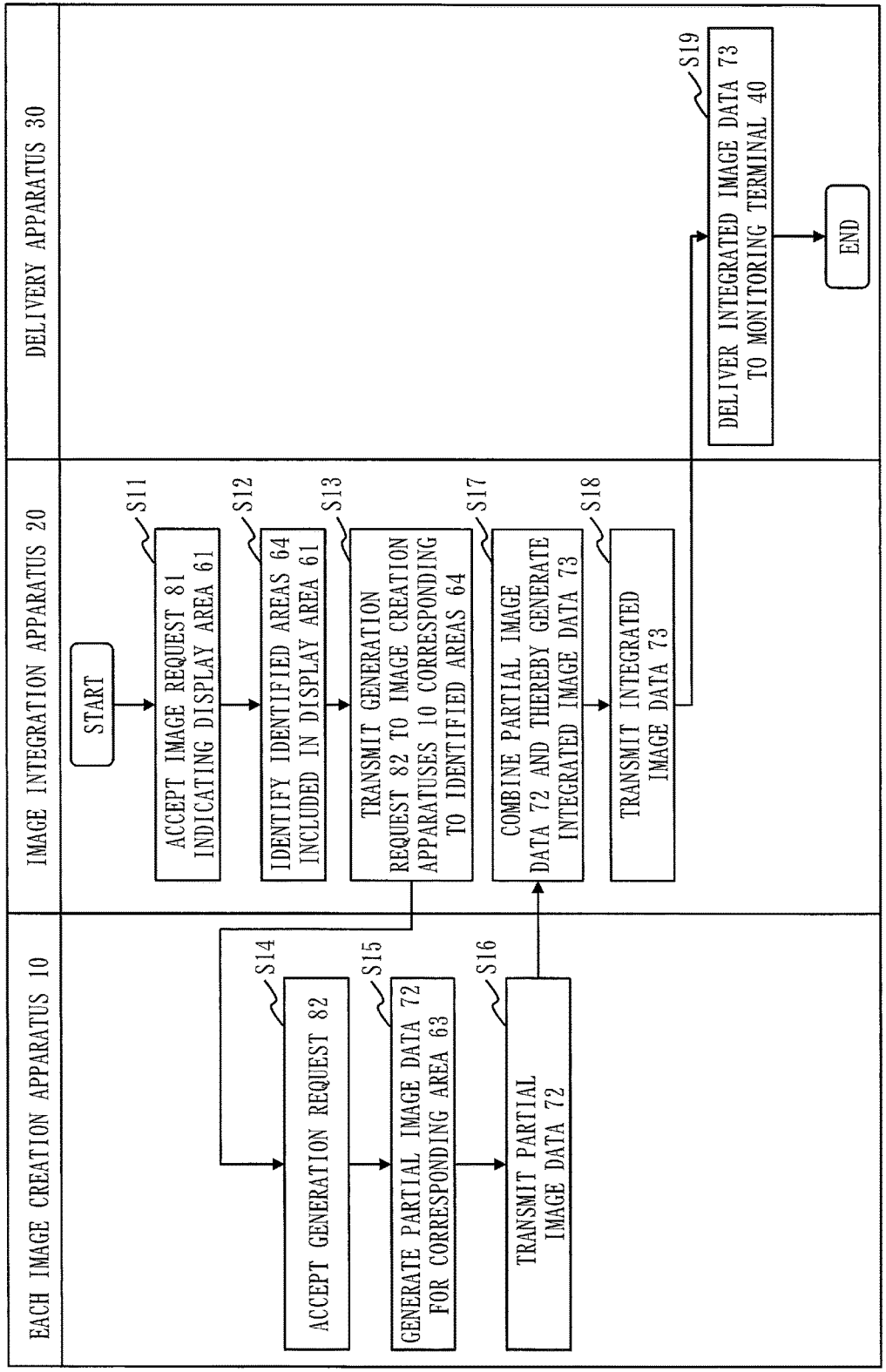
FIG. 5 is a flowchart showing operation of the image generation system 1 according to the first embodiment.

With reference to FIG. 5, the operation of the image generation system 1 according to the first embodiment will be described.

The operation of the image generation system 1 according to the first embodiment corresponds to an image generation method according to the first embodiment. In addition, the operation of the image generation system 1 according to the first embodiment corresponds to the processes of an image generation program according to the first embodiment.

In an area acceptance process at step S11, the area accepting unit 211 of the image integration apparatus 20 accepts an image request 81 indicating a display area 61 from any of the monitoring terminals 40.

Specifically, the area accepting unit 211 receives, as a request, an image request 81 indicating a display area 61 from any of the monitoring terminals 40 through the communication apparatus 23. Then, the area accepting unit 211 writes the received image request 81 into the storage apparatus 22.

In the first embodiment, it is assumed that the display area 61 is a rectangular region and represented by the coordinates of an upper left corner with a reference point being an origin point, and the lengths of a vertical side and a horizontal side. Note that the display area 61 may be a region of other shapes such as a circular region or an elliptical region, instead of a rectangular region. In addition, the display area 61 may be represented by other methods, such as in a case of a rectangular region, the display area 61 is represented by the coordinates of an upper left corner and the coordinates of a lower right corner.

In an area identification process at step S12, the image requesting unit 212 identifies, as identified areas 64, areas 62 each including at least a part of the display area 61 indicated by the image request 81 which is accepted at step S11.

Figure 6:
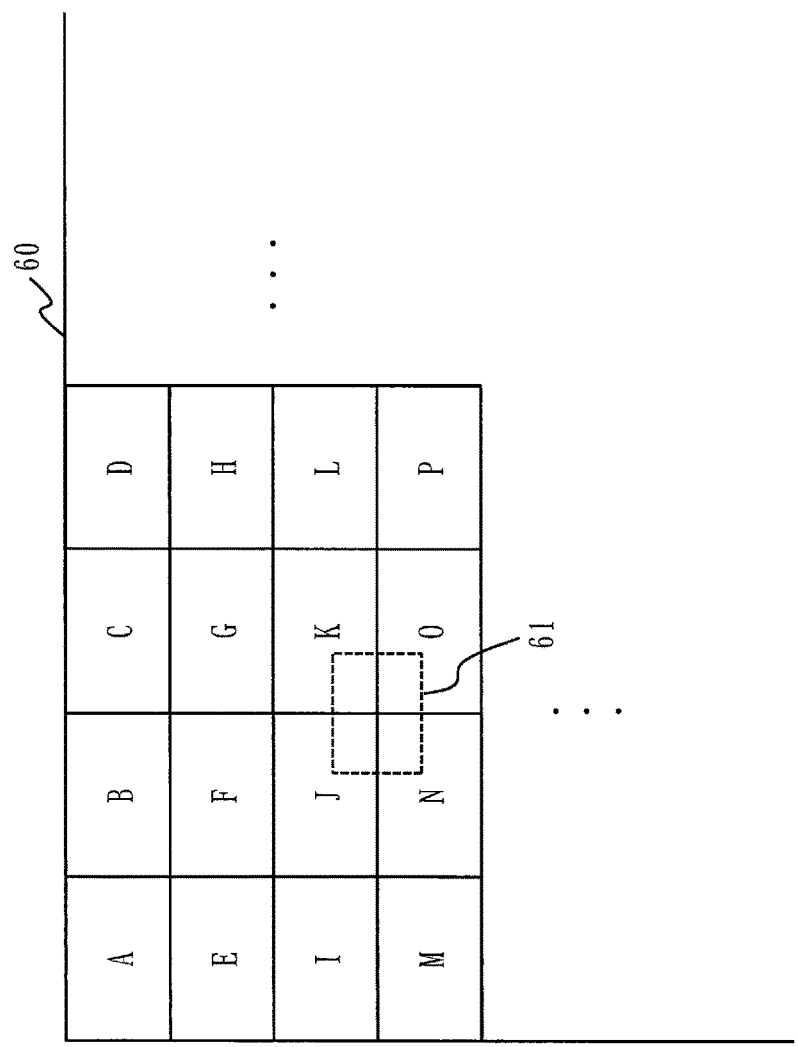
FIG. 6 is an illustrative diagram of operation of the image generation system 1 according to the first embodiment.

With reference to FIG. 6, a specific description will be made. The image requesting unit 212 reads the image request 81 written at step S11 from the storage apparatus 22. The image requesting unit 212 identifies, as identified areas 64, areas 62 each including at least a part of the display area 61, from the coordinates of each area 62 and the display area 61 indicated by the image request 81. The areas 62 each including at least a part of the display area 61 can be identified by comparing the coordinates of four corners of each area 62 with the display area 61. Then, the image requesting unit 212 writes the identified areas 64 having been identified into the storage apparatus 22.

In FIG. 6, a region surrounded by a dashed line is the display area 61. In this case, areas 62J, 62K, 62N, and 62O, at least a part of which is included in the region surrounded by the dashed line, are identified as identified areas 64.

In an image request process at step S13, the image requesting unit 212 transmits a generation request 82 requesting to generate downward view image data for a corresponding area 63, to each of image generation apparatuses 10 provided so as to correspond to the identified areas 64, respectively, which are identified at step S12.

Specifically, the image requesting unit 212 reads the identified areas 64 written at step S12 from the storage apparatus 22. The image requesting unit 212 identifies image generation apparatuses 10 whose corresponding areas 63 are the identified areas 64. Note that it is assumed that which area 62 is which corresponding area 63 of an image generation apparatus 10 is stored in advance in the storage apparatus 22. The image requesting unit 212 transmits, as a request, to each of the identified image generation apparatuses 10 a generation request 82 requesting to generate downward view image data for the corresponding area 63 of the image generation apparatus 10, through the communication apparatus 23.

In FIG. 6, the identified areas 64 are the areas 62J, 62K, 62N, and 62O. A request to generate downward view image data for a corresponding area 63 is provided to four image generation apparatuses 10 whose corresponding areas 63 are the areas 62J, 62K, 62N, and 62O.

In a request acceptance process at step S14, the request accepting unit 111 of the image generation apparatus 10 accepts the generation request 82 transmitted at step S13.

Specifically, the request accepting unit 111 receives, as a request, the generation request 82 through the communication apparatus 13. Then, the request accepting unit 111 writes the received generation request 82 into the storage apparatus 12.

In a partial image generation process at step S15, the partial image generating unit 112 generates downward view image data for the corresponding area 63 as partial image data 72, in response to the request of the generation request 82 accepted at step S14.

Specifically, the partial image generating unit 112 reads the generation request 82 written at step S14 from the storage apparatus 12. When the partial image generating unit 112 reads the generation request 82, the partial image generating unit 112 obtains imaging data 71 from each imaging apparatus 50. The partial image generating unit 112 performs downward view transformation on each imaging data 71, and then combines the imaging data 71 and thereby generates partial image data 72. Then, the partial image generating unit 112 writes the generated partial image data 72 into the storage apparatus 12.

Figure 7:
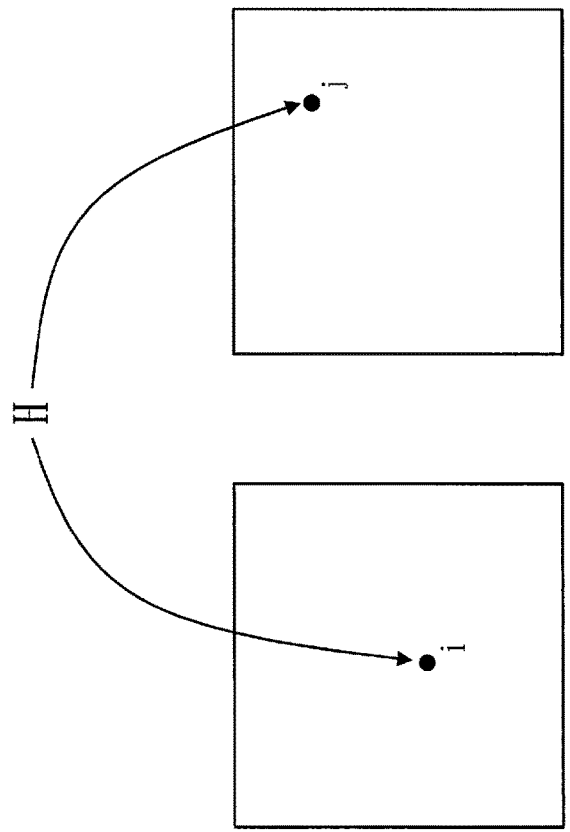
FIG. 7 is an illustrative diagram of a parametric transformation process.

A downward view transformation process includes an image distortion correction process and a parametric transformation process, and is a process of shifting the viewpoint of an image upward. The image distortion correction process is to correct distortion resulting from the characteristics of a lens. A computation parameter for correcting distortion depends on the lens specifications of the imaging apparatuses 50, and is assumed to be stored in advance in the storage apparatus 12. Note, however, that when lenses have large individual differences, individual correction may be required. The parametric transformation process uses a homography matrix H shown in FIG. 7 to generate a point j of a downward view image from a point i of a distortion-corrected image. It is assumed that the homography matrix H can be calculated from the coordinates of four feature points, and is calculated and stored in the storage apparatus 12 in advance. The homography matrix H can be specifically calculated by placing a checkerboard in an imaging range when an imaging apparatus 50 is installed, performing capturing, and measuring distortion of captured image data.

In a process of combining downward view image data having been subjected to downward view transformation, a blending process is performed on overlapping portions of pieces of imaging data 71 using a distance parameter as a weight, by which a seamless image that looks as if it were photographed by a single imaging apparatus 50 can be obtained.

In a partial image transmission process at step S16, the partial image transmitting unit 113 transmits the partial image data 72 generated at step S15 to the image integration apparatus 20.

Specifically, the partial image transmitting unit 113 reads the partial image data 72 written at step S15 from the storage apparatus 12. Then, the partial image transmitting unit 113 transmits the partial image data 72 to the image integration apparatus 20 through the communication apparatus 13.

In an image integration process at step S17, the image integrating unit 213 of the image integration apparatus 20 obtains the partial image data 72 transmitted from each image generation apparatus 10 at step S16. Then, the image integrating unit 213 combines the obtained pieces of partial image data 72 and thereby generates integrated image data 73 which is downward view image data for the display area 61.

Specifically, the image integrating unit 213 receives, through the communication apparatus 23, the partial image data 72 transmitted from each image generation apparatus 10 at step S16. Then, the image integrating unit 213 combines overlapping portions of the pieces of partial image data 72 by performing a blending process using a distance parameter as a weight, and thereby generates integrated image data 73. The image integrating unit 213 writes the generated integrated image data 73 into the storage apparatus 22.

In an integrated image transmission process at step S18, the integrated image transmitting unit 214 transmits the integrated image data 73 generated at step S17 to the delivery apparatus 30.

Specifically, the integrated image transmitting unit 214 reads the integrated image data 73 written at step S17 from the storage apparatus 22. Then, the integrated image transmitting unit 214 cuts out image data corresponding to the display area 61 from the integrated image data 73, and transmits the image data to the delivery apparatus 30 through the communication apparatus 23. At this time, identification information of the monitoring terminal 40 which is the source having transmitted the image request 81 at step S11 is transmitted to the delivery apparatus 30, together.

In an image delivery process at step S19, the image delivering unit 311 of the delivery apparatus 30 delivers the integrated image data 73 transmitted at step S18, to the monitoring terminal 40 which is the source of the image request 81.

Specifically, the image delivering unit 311 receives the integrated image data 73 transmitted at step S18, together with the identification information of the monitoring terminal 40 which is the source of the image request 81. Then, the image delivering unit 311 transmits the received integrated image data 73 to a destination corresponding to the identification information.

By this, the monitoring terminal 40 which is the source of the image request 81 obtains the integrated image data 73 which is downward view image data for the display area 61. Then, the monitoring terminal 40 displays the obtained integrated image data 73 on a display apparatus.

The operation shown in FIG. 5 is performed every time an image request 81 is transmitted from each monitoring terminal 40. When, during the process for a given monitoring terminal 40, an image request 81 is transmitted from another monitoring terminal 40, image generation apparatuses 10 and the image integration apparatus 20 perform processes in a time-division manner.

The processes at step S15 to S19 may be repeatedly performed until another image request 81 is transmitted from the same monitoring terminal 40 or until a stop instruction is provided from the monitoring terminal 40. That is, once an image request 81 has been transmitted from a monitoring terminal 40, downward view image data for a display area 61 which is indicated by the image request 81 may be sequentially updated and delivered. By this, continuous downward view image data for the display area 61 can be displayed on the monitoring terminal 40.

At step S18 or 19, in order to reduce network traffic, the image delivering unit 311 may compress and deliver the integrated image data 73. A format used for compression may be consecutive still images such as Motion JPEG or may be a compressed moving image such as MPEG/H.264.

In FIG. 6, each area 62 is rectangular and the areas 62 are arranged in a tile-like manner. However, in reality, the shape of the area 62 is affected by obstacles, such as posts and walls, and an imaging range which is determined by the angle of view, orientation, and installation height of the lens of the imaging apparatus 50. Hence, the shapes of the areas 62 do not become rectangular and the areas 62 are not always arranged in an exact tile-like manner.

Figure 8:
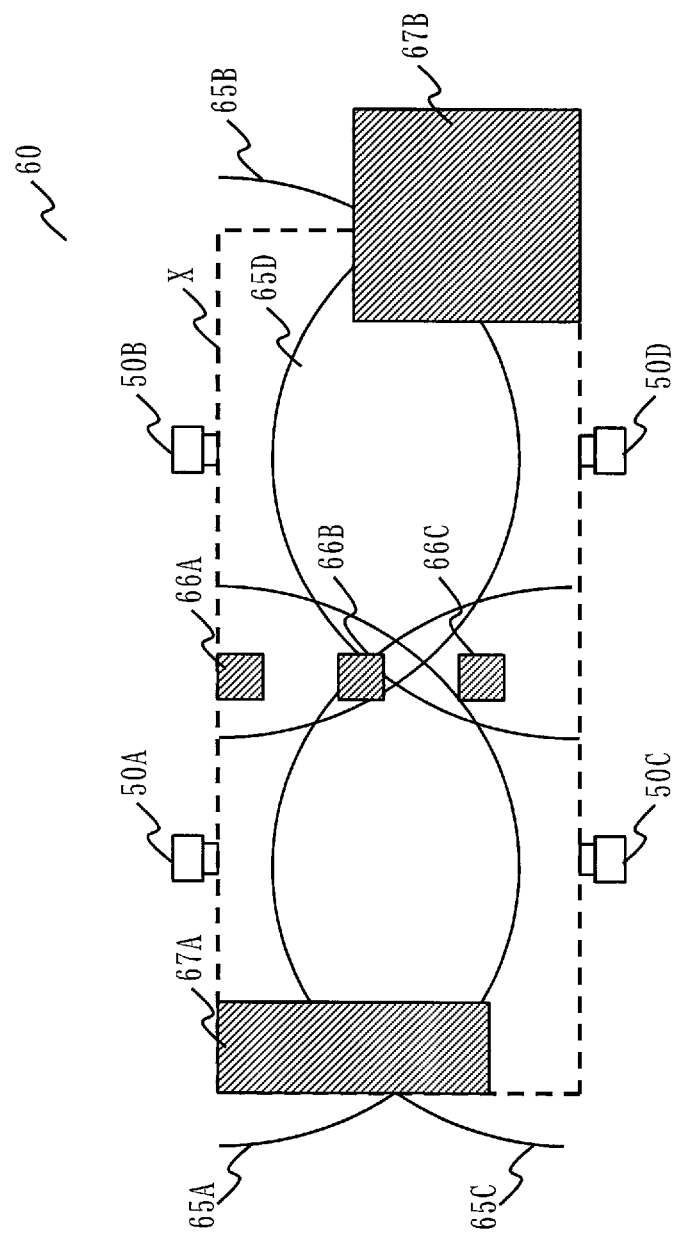
FIG. 8 is an illustrative diagram of an area 62.

With reference to FIG. 8, a case in which the shapes of the areas 62 do not become rectangular and the areas 62 are not arranged in an exact tile-like manner will be described. In FIG. 8, an imaging apparatus 50A captures an imaging range 65A, an imaging apparatus 50B captures an imaging range 65B, an imaging apparatus 50C captures an imaging range 65C, and an imaging apparatus 50D captures an imaging range 65D. When a corresponding area 63 of an image generation apparatus 10 having the imaging apparatuses 50A to 50D connected thereto is made rectangular, an area X is the corresponding area 63. However, in reality, the ranges of posts 66A to 66C and walls 67A and 67B cannot be captured. Therefore, the corresponding area 63 of the image generation apparatus 10 having the imaging apparatuses 50A to 50D connected thereto is a range in which the ranges of the posts 66A to 66C and the walls 67A and 67B are excluded from the area X.

When the shapes of the areas 62 do not become rectangular and the areas 62 are not arranged in an exact tile-like manner, a two-dimensional map representing each area 62 such as that shown in FIG. 8 is generated beforehand. Then, the image requesting unit 212 compares the two-dimensional map with a display area 61 and thereby identifies areas 62 included in the display area 61.

The two-dimensional map is a map generated by an apparatus such as a camera installation simulator. The camera installation simulator is an apparatus that determines optimal camera disposition by simulation. The camera installation simulator finds optimal camera disposition that covers the entire region with a minimum number of cameras, based on the angle-of-view information of lenses, and outputs the camera disposition with information of an imaging range of each camera. Here, the camera disposition includes the positions, orientations, and installation heights of cameras. The components of the two-dimensional map may be numerical position information of posts and walls or may be point cloud information with a rough scale.

*Advantageous Effect of the First Embodiment*

As described above, in the image generation system 1 according to the first embodiment, downward view image data for the entire target area 60 does not need to be generated every time a request is provided from a monitoring terminal 40, and only downward view image data for a display area 61 requested from a monitoring terminal 40 is generated. By this, the processing load for generating downward view image data can be reduced.

Particularly, in the image generation system 1 according to the first embodiment, a downward view image data generation process with a large processing load is performed by a plurality of image generation apparatuses 10 in a distributed manner. Hence, even in a case of specifying a display area 61 by each of the plurality of monitoring terminals 40 and generating integrated image data 73 which is downward view image data for the specified display area 61, the integrated image data 73 for the display area 61 can be generated at high speed.

The image generation system 1 according to the first embodiment can be used when a congestion state of each spot in the target area 60 is determined. Conventionally, a congestion state is determined while switching image data captured by surveillance cameras; however, by using the image generation system 1 according to the first embodiment, by specifying a location whose congestion state is to be determined, downward view image data for the location can be promptly obtained. Hence, a congestion state can be determined easily and promptly over the conventional case.

*Other Configurations*

In the first embodiment, each function of the image generation apparatus 10, the image integration apparatus 20, and the delivery apparatus 30 is implemented by software. However, as a variant, each function of the image generation apparatus 10, the image integration apparatus 20, and the delivery apparatus 30 may be implemented by hardware. Regarding this variant, differences from the first embodiment will be described.

Figure 9:
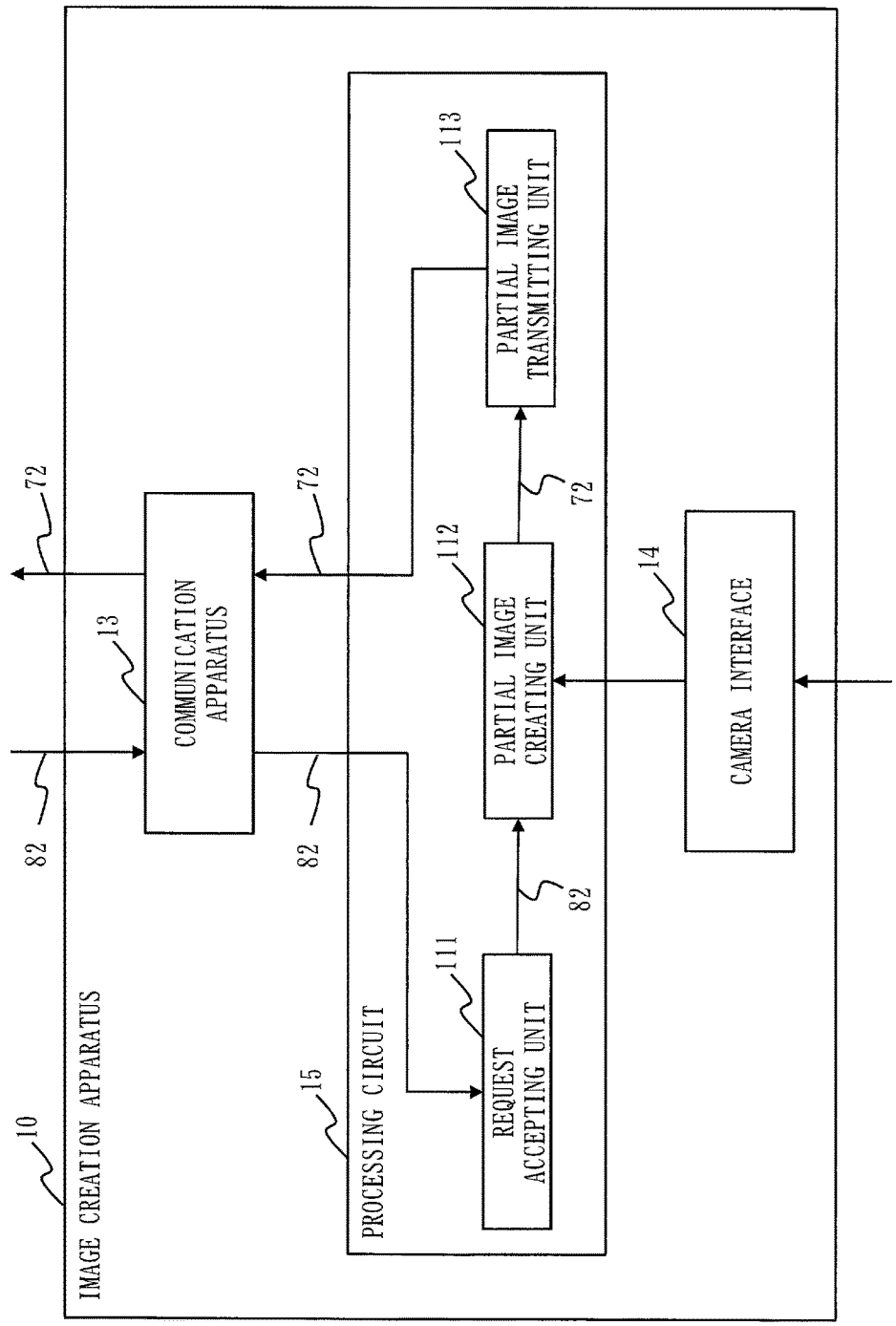
FIG. 9 is a configuration diagram of an image generation apparatus 10 for a case of implementing a function of each unit by hardware.

FIG. 9 is a configuration diagram of an image generation apparatus 10 for a case of implementing a function of each unit by hardware.

When a function of each unit is implemented by hardware, the image generation apparatus 10 includes a communication apparatus 13, a camera interface 14, and a processing circuit 15. The processing circuit 15 is a dedicated electronic circuit that implements a function of each unit of the image generation apparatus 10 and a function of a storage apparatus 12.

Figure 10:
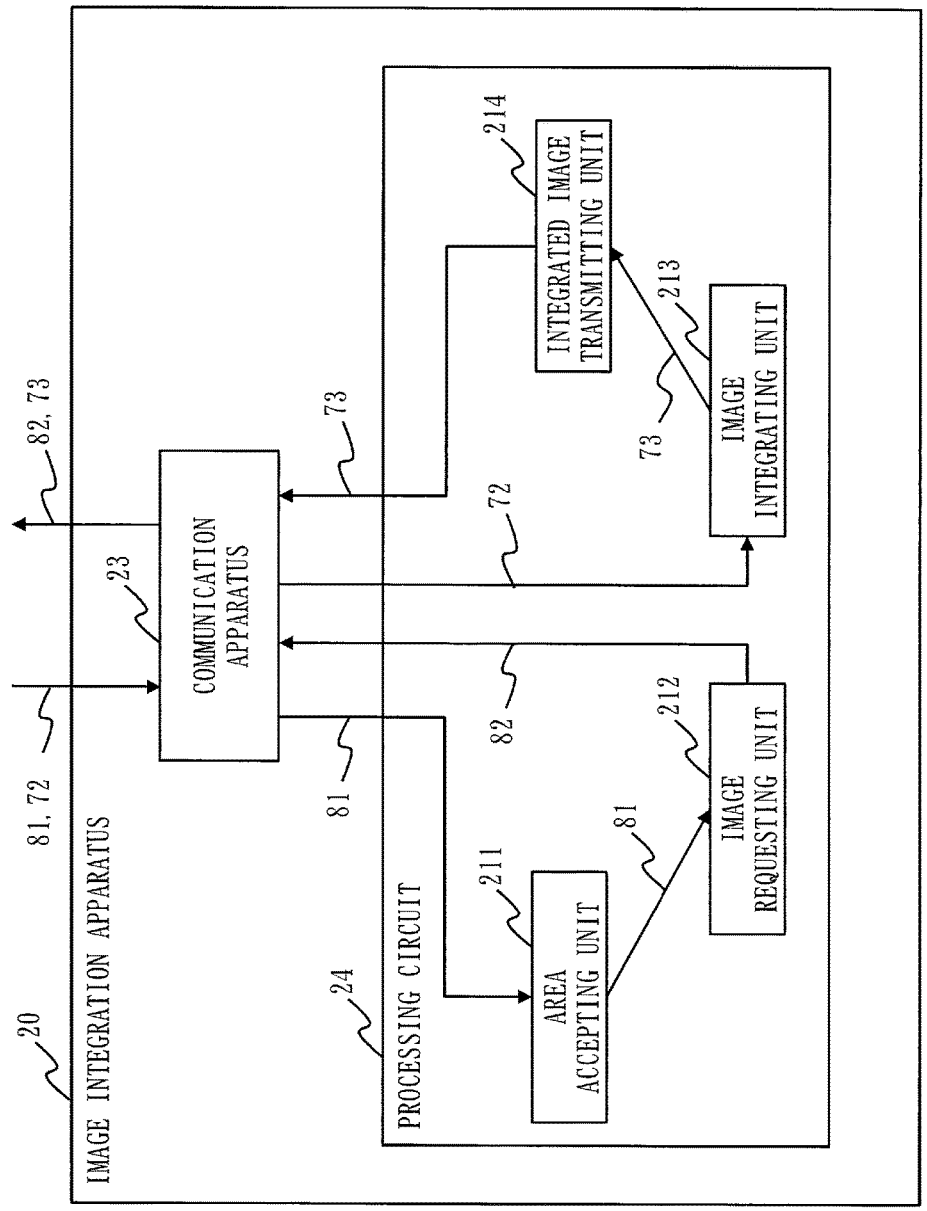
FIG. 10 is a configuration diagram of an image integration apparatus 20 for a case of implementing a function of each unit by hardware.

FIG. 10 is a configuration diagram of an image integration apparatus 20 for a case of implementing a function of each unit by hardware.

When a function of each unit is implemented by hardware, the image integration apparatus 20 includes a communication apparatus 23 and a processing circuit 24. The processing circuit 24 is a dedicated electronic circuit that implements a function of each unit of the image integration apparatus 20 and a function of a storage apparatus 22.

Figure 11:
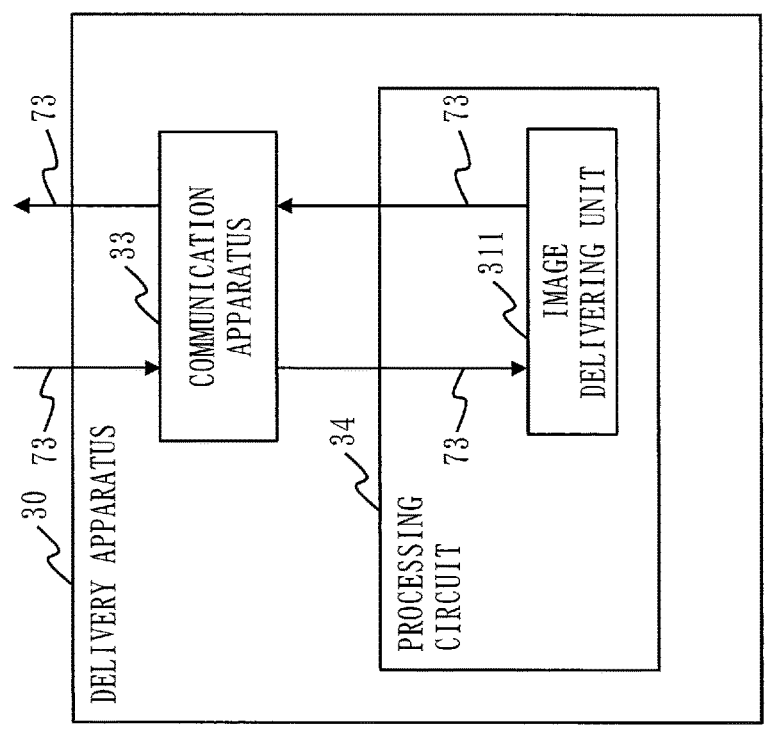
FIG. 11 is a configuration diagram of a delivery apparatus 30 for a case of implementing a function of each unit by hardware.

FIG. 11 is a configuration diagram of a delivery apparatus 30 for a case of implementing a function of each unit by hardware.

When a function of each unit is implemented by hardware, the delivery apparatus 30 includes a communication apparatus 33 and a processing circuit 34. The processing circuit 34 is a dedicated electronic circuit that implements a function of an image delivering unit 311 and a function of a storage apparatus 32.

The processing circuits 15, 24, and 34 each are assumed to be a single circuit, a multiple circuit, a programmed processor, a parallel programmed processor, a logic IC, a GA, an ASIC, or an FPGA. The GA is an abbreviation for gate array. The ASIC is an abbreviation for application specific integrated circuit. The FPGA is an abbreviation for field-programmable gate array.

The function of each unit may be implemented by a single processing circuit 15, 24, 34 or may be implemented by a plurality of processing circuits 15, 24, 34 in a distributed manner.

In addition, as another variant, some functions may be implemented by hardware and other functions may be implemented by software. That is, some functions of the units of the image generation apparatus 10 may be implemented by hardware, and other functions may be implemented by software. For the image integration apparatus 20, too, some functions may be implemented by hardware, and other functions may be implemented by software.

The processor 11, 21, 31, the storage apparatus 12, 22, 32, and the processing circuit 15, 24, 34 are collectively referred to as "processing circuitry". That is, the function of each unit is implemented by the processing circuitry. Namely, whichever configuration shown in FIG. 2 or 9 the image generation apparatus 10 has, the function of each unit is implemented by the processing circuitry. Likewise, whichever configuration shown in FIG. 3 or 10 the image integration apparatus 20 has, the function of each unit is implemented by the processing circuitry. Likewise, whichever configuration shown in FIG. 4 or 11 the delivery apparatus 30 has, the function of the image delivering unit 311 is implemented by the processing circuitry.

Second Embodiment

A second embodiment differs from the first embodiment in that an area that serves as a display area 61 in the future is predicted, and before the area is specified as the display area 61, downward view image data for the predicted area is generated. In the second embodiment, the different part will be described.

In the second embodiment, a case in which a display area 61 has been specified again by scrolling the display area 61 will be described.

*Description of Configuration*

Figure 12:
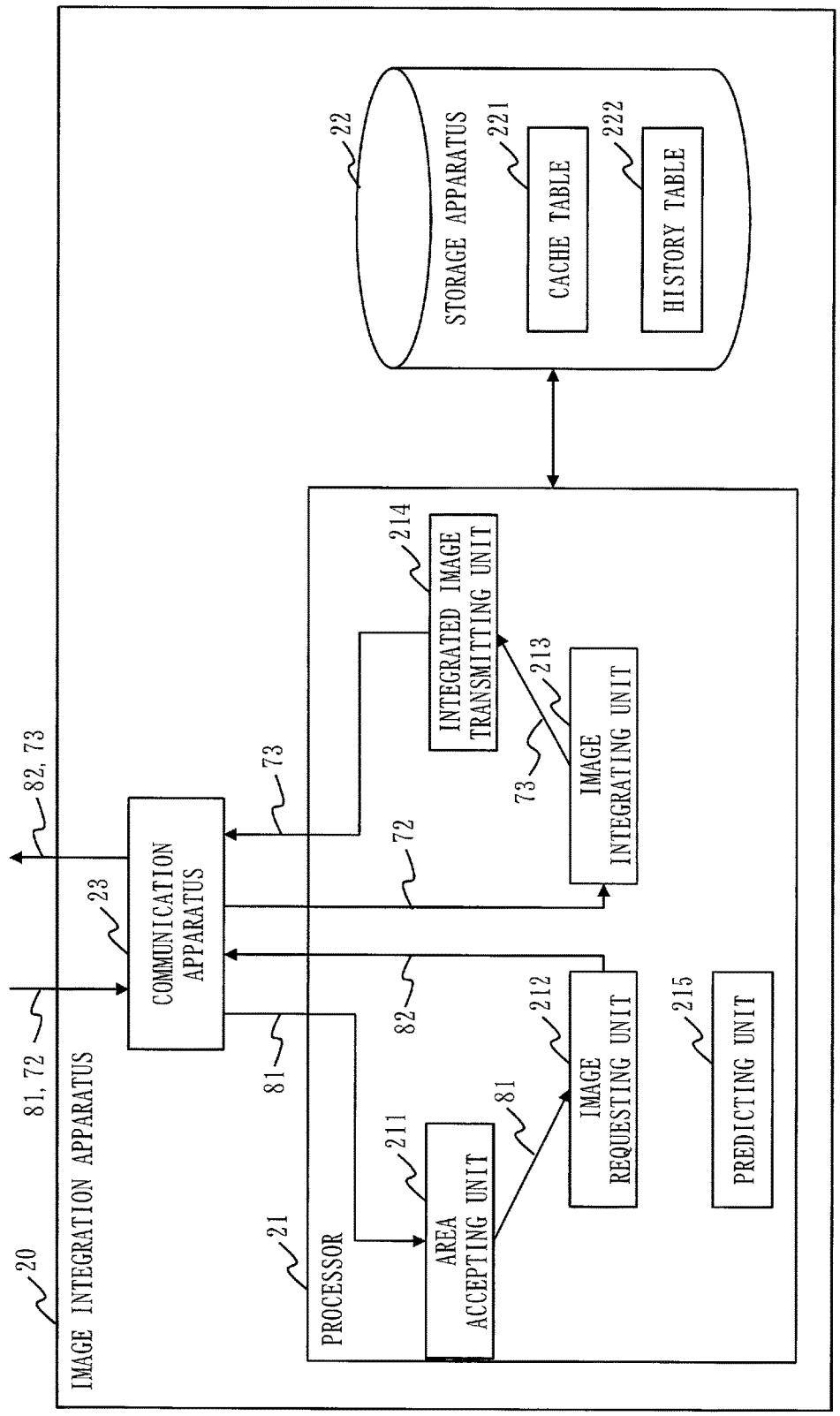
FIG. 12 is a configuration diagram of an image integration apparatus 20 according to a second embodiment.

With reference to FIG. 12, a configuration of an image integration apparatus 20 according to the second embodiment will be described.

The image integration apparatus 20 includes a predicting unit 215 in addition to the functional configuration shown in FIG. 3. A function of the predicting unit 215 is implemented by software as with other functions.

In addition, a storage apparatus 22 stores therein a cache table 221 and a history table 222.

As shown in FIG. 13, the cache table 221 is a table in which integrated image data 73 is stored so as to be associated with a monitoring terminal 40 and a display area 61, together with a time at which the integrated image data 73 is generated.

As shown in FIG. 14, the history table 222 is a table that stores the coordinates of an upper left corner of the display area 61 and the angle and distance of scrolling.

In the history table 222, the angle and distance of scrolling from time T-n to time T-(n−1) are stored in a time T-n field. Hence, in a time T field that stores about the latest display area 61, the angle and distance of scrolling are not stored, but only the coordinates of the upper left corner of the display area 61 are stored.

A configuration of an image generation system 1, a configuration of an image generation apparatus 10, and a configuration of a delivery apparatus 30 are the same as those of the first embodiment.

*Description of Operation*

Figure 15:
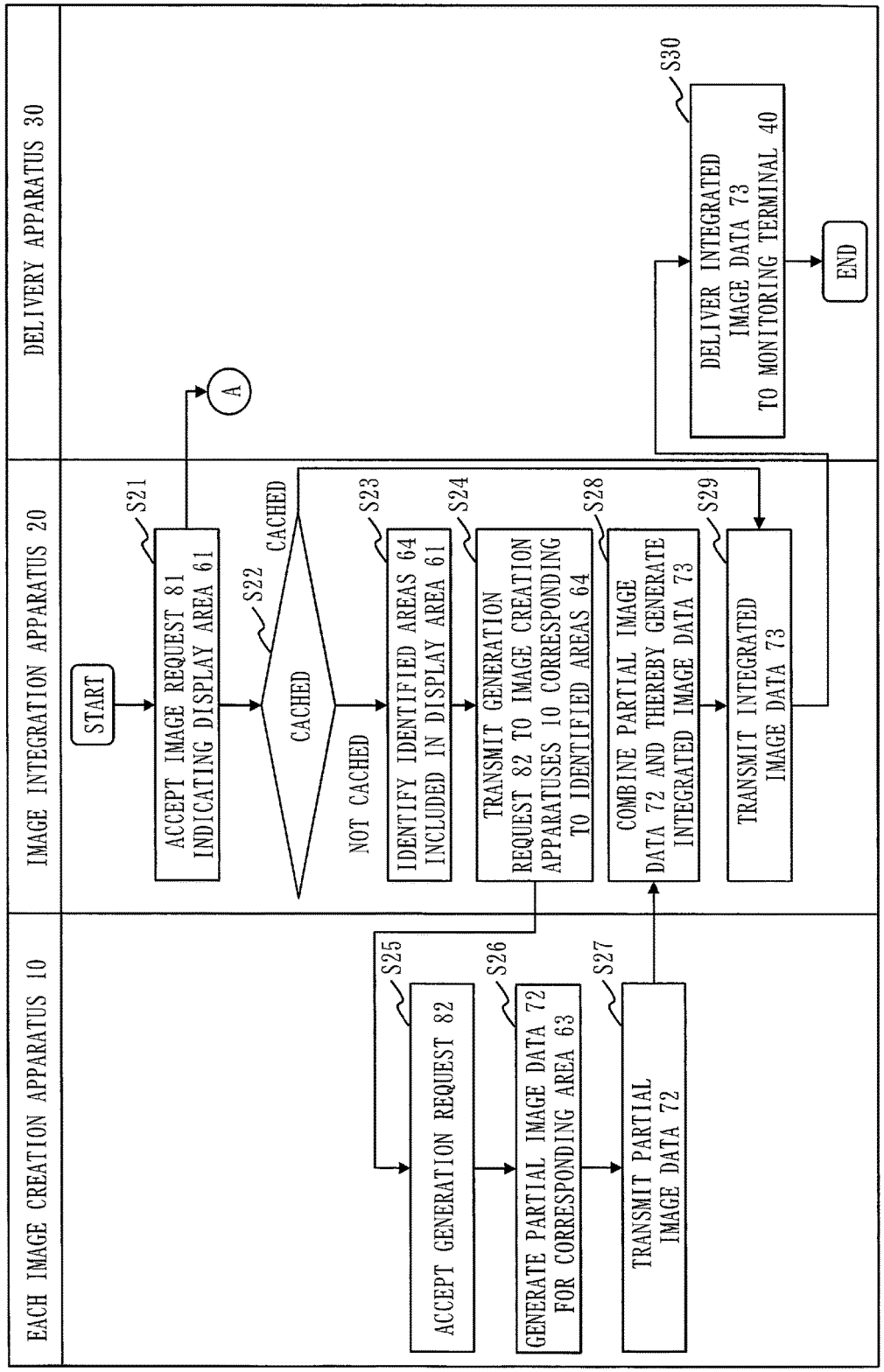
FIG. 15 is a flowchart showing operation of an image generation system 1 according to the second embodiment.
Figure 16:
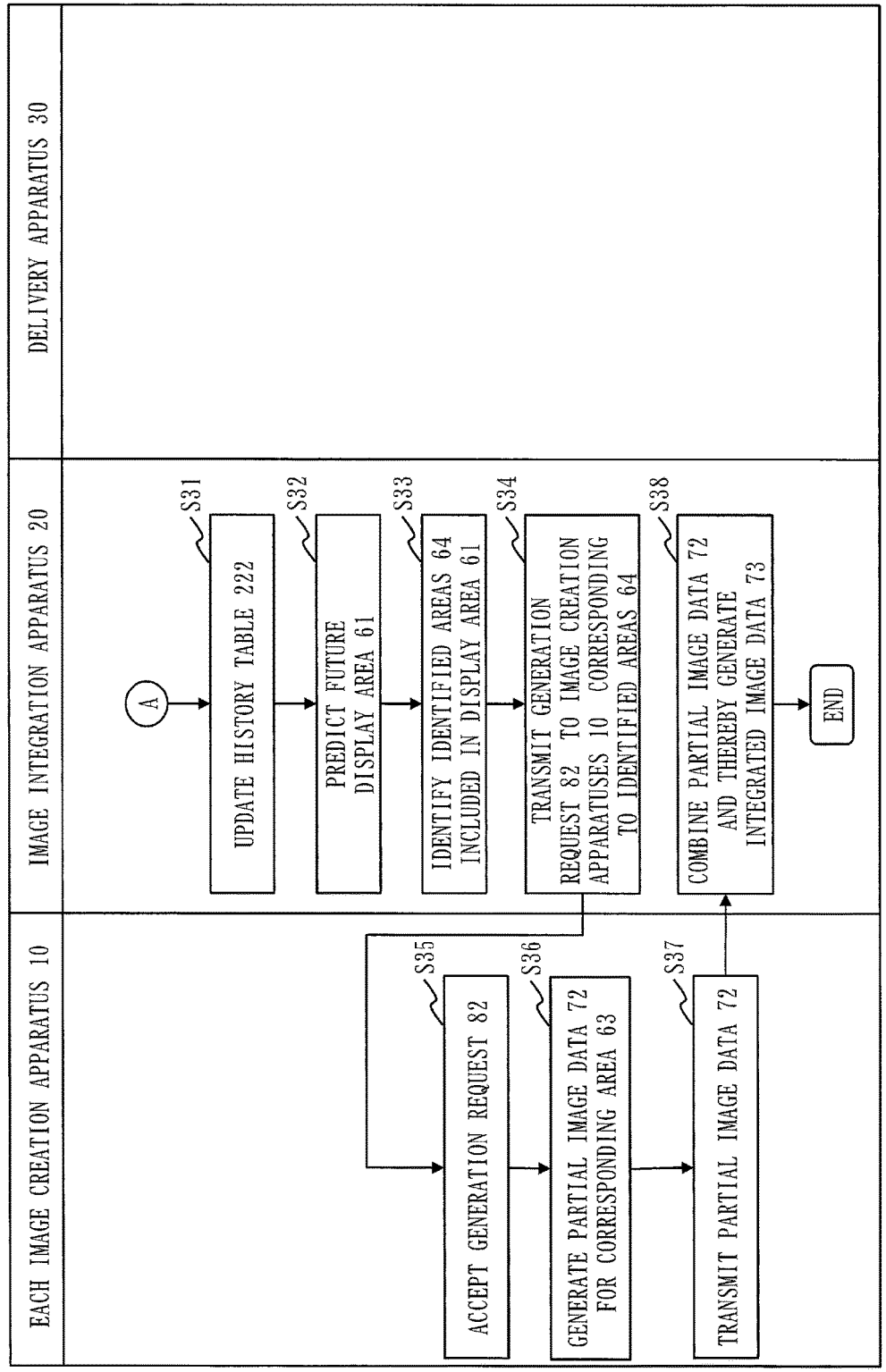
FIG. 16 is a flowchart showing operation of the image generation system 1 according to the second embodiment.

With reference to FIGS. 15 and 16, the operation of the image generation system 1 according to the second embodiment will be described.

The operation of the image generation system 1 according to the second embodiment corresponds to an image generation method according to the second embodiment. In addition, the operation of the image generation system 1 according to the second embodiment corresponds to the processes of an image generation program according to the second embodiment.

In the second embodiment, it is assumed that a display area 61 specified initially is scrolled, by which a new display area 61 is specified again.

A process at step S21 is the same as the process at step S11 shown in FIG. 5.

In a cache determination process at step S22, the image requesting unit 212 determines whether integrated image data 73 which is downward view image data for a display area 61 accepted at step S21 is stored in the cache table 221 in the storage apparatus 22.

Specifically, the image requesting unit 212 reads an image request 81 written at step S21 from the storage apparatus 22. The image requesting unit 212 searches the cache table 221 by a monitoring terminal 40 which is the source of the image request 81 and the display area 61 indicated by the image request 81. If there is a hit, the image requesting unit 212 determines that the integrated image data 73 is stored in the cache table 221, and if there is no hit, the image requesting unit 212 determines that the integrated image data 73 is not stored in the cache table 221.

If the integrated image data 73 is not stored in the cache table 221, the image requesting unit 212 proceeds processing to step S23. On the other hand, if the integrated image data 73 is stored in the cache table 221, the image requesting unit 212 proceeds processing to step S29.

Processes at step S23 to S27 are the same as the processes at step S12 to S16 shown in FIG. 5.

In an image integration process at step S28, the image integrating unit 213 combines partial image data 72 transmitted from each image generation apparatus 10 and thereby generates integrated image data 73. The image integrating unit 213 writes the generated integrated image data 73 into the cache table 221 such that the generated integrated image data 73 is associated with the monitoring terminal 40 which is the source and the display area 61 indicated by the image request 81.

In an integrated image transmission process at step S29, the integrated image transmitting unit 214 transmits to the delivery apparatus 30 the integrated image data 73 generated at step S28 or the integrated image data 73 stored in the cache table 221.

Specifically, if it is determined at step S22 that the integrated image data 73 is not stored in the cache table 221, the integrated image transmitting unit 214 reads the integrated image data 73 written at step S28 from the storage apparatus 22. On the other hand, if it is determined at step S22 that the integrated image data 73 is stored in the cache table 221, the integrated image transmitting unit 214 reads the integrated image data 73 from the cache table 221. Then, the integrated image transmitting unit 214 cuts out image data corresponding to the display area 61 from the integrated image data 73, and transmits the image data to the delivery apparatus 30 through the communication apparatus 23.

A process at step S30 is the same as the processes at step S18 to S19 shown in FIG. 5.

In a history storage process at step S31, the predicting unit 215 obtains the image request 81 accepted at step S21, and updates the history table 222 based on the display area 61 indicated by the image request 81.

Specifically, the predicting unit 215 moves pieces of information in the history table 222 that are stored in a row corresponding to the monitoring terminal 40 which is the source, to their right fields one by one. That is, in FIG. 14, when the monitoring terminal 40 which is the source has terminal number B, information stored in a time T-2 field is moved to a time T-3 field, information stored in a time T-1 field is moved to the time T-2 field, and information stored in a time T field is moved to the time T-1 field. Then, the predicting unit 215 writes the upper left coordinates of the display area 61 indicated by the image request 81 into the time T field. In addition, the predicting unit 215 computes the angle and distance of scrolling from the upper left coordinates of the display area 61 and the coordinates stored in the time T-1 field, and writes the angle and distance of scrolling into the time T-1 field.

In a prediction process at step S32, the predicting unit 215 predicts, as a predicted area 68, a location serving as a display area 61 in the future, from the angles and distances of scrolling stored in the history table 222.

Figure 17:
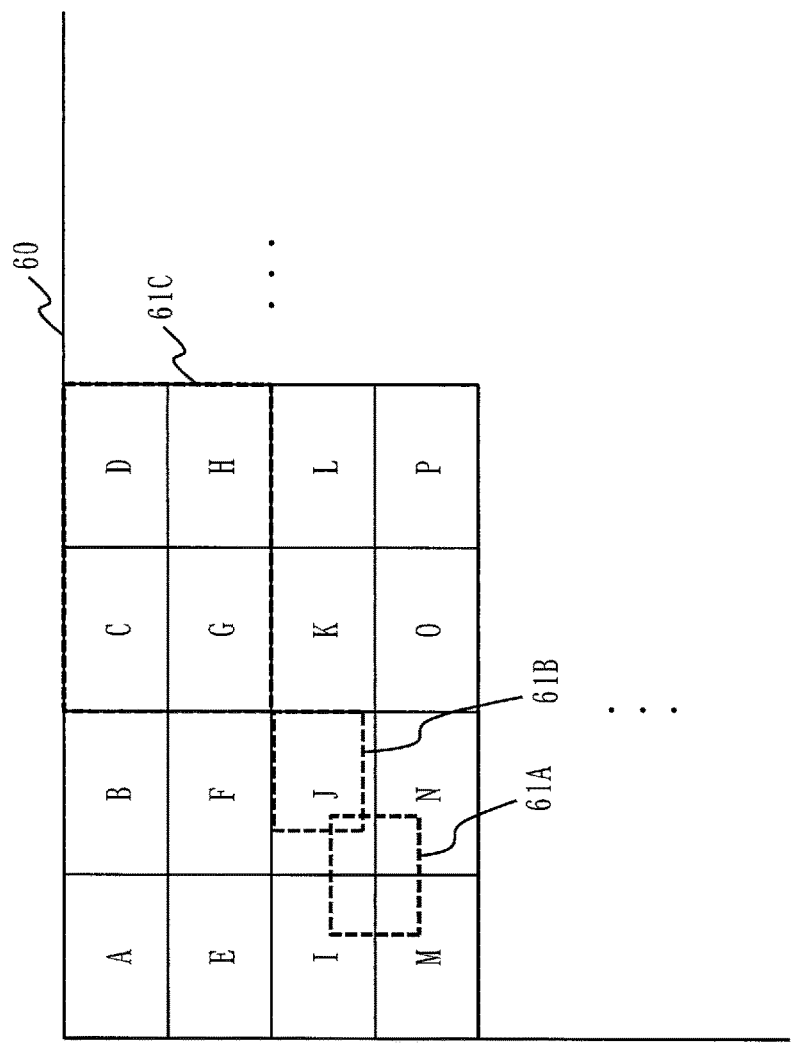
FIG. 17 is an illustrative diagram of a scrolling direction.
Figure 18:
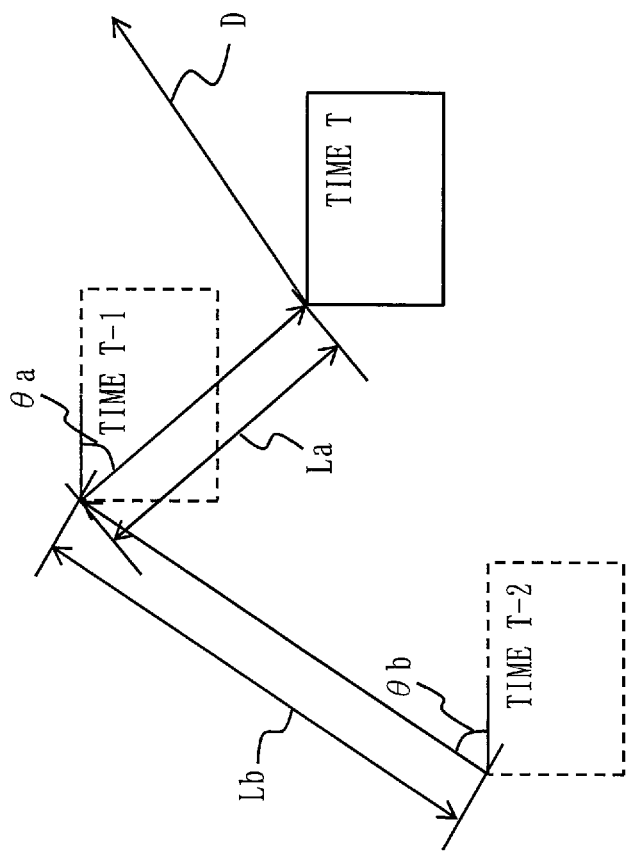
FIG. 18 is an illustrative diagram of a method for predicting a future scrolling direction.

With reference to FIGS. 17 and 18, a specific description will be made. When the display area 61 is specified again by scrolling, it is highly likely that a new display area 61 is specified by scrolling in the same direction as that for the past scrolling. In FIG. 17, it is assumed that, when a display area 61A is specified, a display area 61B is specified again by scrolling. In this case, it is highly likely that a region around a display area 61C is specified thereafter. Hence, the predicting unit 215 predicts the next scrolling direction by averaging the angles and distances of the past scrolling, and predicts a predetermined range in the next scrolling direction as a predicted area 68. In FIG. 18, the angle θa and distance La of scrolling from a display area 61 for time T-1 to a display area 61 for time T, and the angle θb and distance Lb of scrolling from a display area 61 for time T-2 to the display area 61 for time T-1 are used. Then, in FIG. 18, a future scrolling direction D is predicted by (θaLa+θbLb)/(La+Lb).

In a predicted-area identification process at step S33, the image requesting unit 212 identifies, as identified areas 64, areas 62 each including at least a part of the predicted area 68 predicted at step S32. A method for identifying areas 62 each including at least a part of the predicted area 68 is the same as the method for identifying areas 62 each including at least a part of the display area 61 ate step S23.

In a predicted-image request process at step S34, the image requesting unit 212 transmits a generation request 82 requesting to generate downward view image data for a corresponding area 63, to each of image generation apparatuses 10 provided so as to correspond to the identified areas 64, respectively, which are identified at step S33.

Processes at step S35 to S38 are the same as the processes at step S25 to S28.

At step S32, in FIG. 18, the predicted area 68 is predicted by predicting the next scrolling from the past two scrolling. However, the number of past scrolling which is used for prediction is not limited to two and may be other numbers.

A determination as to the number of past scrolling which is used for prediction may be made according to the frequency of scrolling. Specifically, for a higher frequency of scrolling, a prediction may be made using a larger number of scrolling.

*Advantageous Effect of the Second Embodiment*

As described above, in the image generation system 1 according to the second embodiment, an area that serves as a display area 61 in the future is predicted, and before the area is specified as the display area 61, downward view image data for the predicted area is generated as integrated image data 73. Then, when a display area 61 is specified, if integrated image data 73 is already generated, then the integrated image data 73 is read and delivered to a monitoring terminal 40. Hence, the integrated image data 73 can be delivered to the monitoring terminal 40 in a short time.

*Other Configurations*

Although in the second embodiment, as in the first embodiment, each function of the image generation apparatus 10, the image integration apparatus 20, and the delivery apparatus 30 is implemented by software, each function of the image generation apparatus 10, the image integration apparatus 20, and the delivery apparatus 30 may be implemented by hardware. In addition, some of the functions of each of the image generation apparatus 10, the image integration apparatus 20, and the delivery apparatus 30 may be implemented by hardware, and other functions may be implemented by software.

Third Embodiment

A third embodiment differs from the first and second embodiments in that integrated image data 73 is generated at a resolution determined according to the size of a display area 61. In the third embodiment, the differences will be described.

*Description of Configuration*

A configuration of an image generation system 1, a configuration of an image generation apparatus 10, a configuration of an image integration apparatus 20, and a configuration of a delivery apparatus 30 are the same as those of the second embodiment. Note that although in the third embodiment the configurations are the same as those in the second embodiment, the configurations may be the same as those in the first embodiment.

*Description of Operation*

With reference to FIG. 15, the operation of the image generation system 1 according to the third embodiment will be described.

The operation of the image generation system 1 according to the third embodiment corresponds to an image generation method according to the third embodiment. In addition, the operation of the image generation system 1 according to the third embodiment corresponds to the processes of an image generation program according to the third embodiment.

Processes at step S21 to S23, S25, and S27 to S33 are the same as those in the second embodiment.

At step S24 of FIG. 15, the image requesting unit 212 transmits a generation request 82 requesting to generate downward view image data at a resolution determined according to the size of a display area 61 which is indicated by an image request 81 accepted at step S21. Specifically, for a larger display area 61, the image requesting unit 212 transmits a generation request 82 specifying a lower resolution.

Figure 19:
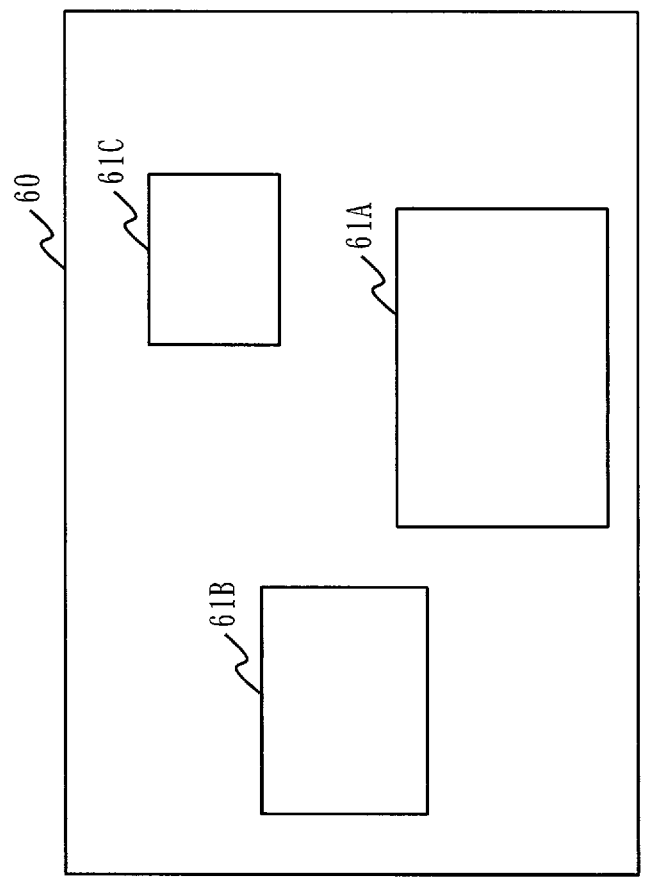
FIG. 19 is an illustrative diagram of a method for specifying a resolution.

In FIG. 19, a display area 61A specified by a monitoring terminal 40A is largest, a display area 61B specified by a monitoring terminal 40B is second largest, and a display area 61C specified by a monitoring terminal 40C is smallest. Hence, for the display area 61A the lowest resolution is specified, for the display area 61B the second lowest resolution is specified, and for the display area 61C the highest resolution is specified.

At step S26, the partial image generating unit 112 generates, as partial image data 72, downward view image data for a corresponding area 63 at the resolution specified by the generation request 82.

Specifically, the partial image generating unit 112 thins out pixel data from imaging data 71, according to the resolution specified by the generation request 82. That is, for a lower resolution, the partial image generating unit 112 thins out more pixel data. Then, the partial image generating unit 112 generates partial image data 72 from the imaging data 71 in which pixel data is thinned out.

*Advantageous Effect of the Third Embodiment*

As described above, in the image generation system 1 according to the third embodiment, when the display area 61 is large, partial image data 72 with a reduced resolution is generated. Hence, the load for the processes of generating partial image data 72 and integrated image data 73 can be reduced.

REFERENCE SIGNS LIST

1: image generation system, 10: image generation apparatus, 11: processor, 12: storage apparatus, 13: communication apparatus, 14: camera interface, 15: processing circuit, 111: request accepting unit, 112: partial image generating unit, 113: partial image transmitting unit, 20: image integration apparatus, 21: processor, 22: storage apparatus, 23: communication apparatus, 24: processing circuit, 211: area accepting unit, 212: image requesting unit, 213: image integrating unit, 214: integrated image transmitting unit, 215: predicting unit, 221: cache table, 222: history table, 30: delivery apparatus, 31: processor, 32: storage apparatus, 33: communication apparatus, 34: processing circuit, 311: image delivering unit, 40: monitoring terminal, 50: imaging apparatus, 60: target area, 61: display area, 62: area, 63: corresponding area, 64: identified area, 65: imaging range, 66: post, 67: wall, 68: predicted area, 71: imaging data, 72: partial image data, and 73: integrated image data.

The invention claimed is:

1. An image generation system comprising:
   image generation apparatuses provided so as to correspond to areas, respectively, into which a target area is divided, the generation apparatuses each being connected to a plurality of imaging apparatuses each capturing a corresponding area being an area that corresponds, and the image generation apparatuses each generating downward view image data for the corresponding area from imaging data captured by the plurality of imaging apparatuses connected; and
   an image integration apparatus, when a display area has been specified again by scrolling the display area for which display is requested, to predict, as a predicted area, a location serving as the display area in future, by predicting, from an angle and a distance at which the scrolling is performed, a direction in which scrolling is performed in future, allow each of image generation apparatuses to generate, as partial image data before the predicted area is specified as the display area, downward view image data for a corresponding area of the image generation apparatus, and combine the generated partial image data to generate integrated image data, the image generation apparatuses being provided so as to correspond to areas, respectively, the areas each including at least a part of the predicted area, the integrated image data being downward view image data for the display area.

2. The image generation system according to claim 1, wherein the image integration apparatus predicts the direction in which scrolling is performed in future, by dividing a sum of products of angles and distances at which scrolling is performed in past by a sum of the distances.

3. An image generation method comprising:
   when a display area has been specified again by scrolling the display area for which display is requested, predicting, as a predicted area, a location serving as the display area in future, by predicting, from an angle and a distance at which the scrolling is performed, a direction in which scrolling is performed in future, by an image integration apparatus;
   of image generation apparatuses provided so as to correspond to areas, respectively, into which a target area is divided, causing each of image generation apparatuses provided so as to correspond to areas, respectively, each including at least a part of the predicted area, to generate, as partial image data before the predicted area is specified as the display area, downward view image data for a corresponding area from imaging data captured by a plurality of imaging apparatuses, the plurality of imaging apparatuses capturing the corresponding area, and the corresponding area being an area corresponding to the image generation apparatus, by the image integration apparatus; and
   combining the generated partial image data to generate integrated image data, the integrated image data being downward view image data for the display area, by the image integration apparatus.

* * * * *